United States Patent
Serban et al.

(10) Patent No.: US 6,737,953 B2
(45) Date of Patent: May 18, 2004

(54) PASSENGER DETECTOR

(75) Inventors: Bogdan Serban, Niederkorn (LU); Michel Witte, Luxembourg (LU)

(73) Assignee: I.E.E. International Electronics & Engineering S.A.R.L. (LU)

( * ) Notice: Subject to any disclaimer, the term of this patent is extended or adjusted under 35 U.S.C. 154(b) by 0 days.

(21) Appl. No.: 09/848,402

(22) Filed: May 4, 2001

(65) Prior Publication Data

US 2001/0042412 A1 Nov. 22, 2001

Related U.S. Application Data

(63) Continuation of application No. PCT/EP99/08375, filed on Nov. 3, 1999.

(30) Foreign Application Priority Data

Nov. 4, 1998 (LU) ................................................ 90309

(51) Int. Cl.$^7$ ............................................ G01L 1/22
(52) U.S. Cl. .............................. 338/2; 338/47; 338/99; 338/114; 338/211
(58) Field of Search ............................. 338/2, 5, 647, 338/99, 114, 211, 212, 213

(56) References Cited

U.S. PATENT DOCUMENTS

| | | | |
|---|---|---|---|
| 4,258,100 A | * 3/1981 | Fujitani et al. | 428/316.6 |
| 4,506,250 A | * 3/1985 | Kirby | 338/5 |
| 4,715,235 A | * 12/1987 | Fukui et al. | 73/862.68 |
| 4,823,106 A | * 4/1989 | Lovell | 338/212 |
| 4,876,419 A | * 10/1989 | Lodini | 200/86 R |
| 5,010,774 A | * 4/1991 | Kikuo et al. | 73/862.046 |
| 5,060,527 A | * 10/1991 | Burgess | 73/862.68 |
| 5,079,535 A | * 1/1992 | Neuman et al. | 338/2 |
| 5,086,785 A | * 2/1992 | Gentile et al. | 128/782 |
| 5,296,837 A | * 3/1994 | Yaniger | 338/47 |
| 5,583,303 A | * 12/1996 | Franz | 73/862.046 |
| 5,606,303 A | * 2/1997 | Suski | 338/210 |
| 5,625,333 A | * 4/1997 | Clark et al. | 338/2 |
| 5,847,639 A | * 12/1998 | Yaniger | 338/99 |
| 5,948,990 A | * 9/1999 | Hashida | 73/725 |

FOREIGN PATENT DOCUMENTS

| | | |
|---|---|---|
| DE | 42 37 072 | 12/1993 |
| DE | 197 38 531 | 5/1998 |
| WO | WO 97/18450 | 5/1997 |
| WO | WO 97/40339 | 10/1997 |
| WO | WO 00/26626 | 5/2000 |

OTHER PUBLICATIONS

Kurumatani et al. US 2001/0006868 (Jul. 2001).*
Reihnhold et al. DE 4237072 (english translation) (Dec. 1993).*
Form PCT/IPEA/416 Notification of Transmittal of the International Preliminary Examination Report (PCT/EP99/08375).
Form PCT/IPEA/409 (International Preliminary Examination Report) (PCT/EP99/08375) in the French language with attached English language translation of the Annex (i.e., the specification and claim replacement pages presented during the International stage).

(List continued on next page.)

*Primary Examiner*—Karl D. Easthom
(74) *Attorney, Agent, or Firm*—Smith, Gambrell & Russell, LLP

(57) ABSTRACT

A description is given of a passenger detector comprising a flexible support of insulating material, at least two electrode structures placed on said insulating substrate at a certain distance from each other, and a layer of semiconducting material placed above said electrode structures in an active zone of the detector. In conformity with the invention, said layer of semiconducting material has an internal resistance that varies with a deformation of said layer and said layer of semiconducting material is placed in intimate contact with said electrode structures.

24 Claims, 1 Drawing Sheet

OTHER PUBLICATIONS

International Search Report for PCT/EP99/08375 (in English).

Form PCT/IB/308 (Notice Informing The Applicant of the Communication of the International Application to the Designated Offices) (PCT/EP99/08375).

"Robotics and Power Semiconductors Join Forces to Meet the Challenges of the Automated Factory Environment", Electronic Design, vol. 31, No. 10, May 1983; pp. 97–111, XP002092415, Waseca, MN, Denville, NJ, USA.

Form PCT/IPEA/409 (International Preliminary Examination Report) (PCT/EP99/08375) English Language translation.

U.S. Publication No. US 2001/0008389, Published Jul. 19, 2001, entitled "Force Sensor".

* cited by examiner

PASSENGER DETECTOR

The present application is a continuation of PCT/EP99/08375 having an International filing date of Nov. 3, 1999, which PCT application is incorporated herein by reference.

BACKGROUND

The present invention relates to a passenger detector, which is used to detect the presence of a passenger on the seat of a vehicle and/or said passenger's position on said seat. Such a detector has a particular application in controlling a motor vehicle protection system such as airbags.

In order to protect the life of passengers during a traffic accident, modern vehicles are generally fitted with a protection system comprising several airbags and seat belt pretensioners, which are used to absorb the energy of a passenger released during the collision due to the accident. In order to deploy the airbags of the passenger seat only in the case where this seat is actually occupied by a person, passenger detectors have been developed that indicate the presence of a passenger to the control unit of the protection system.

Such a detector is described, for example, in the document DE-A-42 37 072. It concerns a pressure detector integrated into the passenger seat, which comprises two insulating substrates placed one above the other and separated by a certain distance using a separator. The separator comprises, for example, a two-sided adhesive band which is cut in such a way as to surround at least in part the active zones of the detector. Inside the active zones, one of the supporting sheets is provided with two electrode structures made of a conducting material separated from each other, while the other supporting sheet is provided with a coating of a pressure-sensitive semiconducting material. The semiconducting material has microprojections on the surface so that the surface resistance between the layer and a conductor decreases when the layer is pressed on to the conductor.

When the passenger seat is unoccupied, i.e. when no pressure is acting on the passenger detector, the layer of semiconducting material is not in contact with the two electrodes and the electrical resistance between the two electrodes is consequently very high. If, on the contrary, a person is sitting on the seat, the two supporting sheets are pressed together and the pressure-sensitive layer is put into contact with the two electrodes. This produces, between the two electrodes, a short circuit whose electrical resistance varies inversely with the value of the applied pressure. The greater the pressure on the sensor, the more the semiconducting layer is compressed or the more it comes into intimate contact with the electrodes, and the more the resistance measured between the two electrodes decreases.

The document DE 197 38 531 describes a resistance varying with pressure comprising a first substrate and a second substrate. A layer of conducting material is printed on the first substrate, which carries insulating particles having a diameter greater than the thickness of the layer. On the second support two electrodes are arranged at a distance from each other. The two substrates are then laminated together, the insulating particles forming separators to prevent contact between the conducting layer and the electrodes when no pressure is exerted on the sensor.

Another laminated pressure sensor is described in the document WO-A-97/18450. It concerns a sensor for measuring the pressure of a foot, comprising piezoelectric sensors inserted in a flexible structure as in a sandwich One disadvantage of such a detector lies in its high rigidity. In effect, due to the lamination of the two supporting sheets using an adhesive band, the detector is quite thick and has a high resistance to bending or twisting, which significantly reduces its flexibility. Consequently, the introduction of such a detector in the seat of a vehicle may have a detrimental effect on the comfort of the seat.

Another type of force sensor is described in the document "Robotics and power semiconductors join forces to meet the challenges of the automated factory environment"—Electronic Design, vol. 31, no 10, May 1983 (1983-05), pages 97–111, XP002092415, Waseca, Minn., Denville, N.J., USA. This document describes a force sensor comprising two electrode structures placed one on top of the other. The first of these electrode structures is placed on a silicon substrate, while the second is formed by a conducting elastomer. Placed between these two structures is an insulating layer separating the two electrodes when no force is acting on the sensor. It is clear that, due to its rigid support, such a sensor is in no way suitable for being integrated into a car seat.

SUMMARY OF THE INVENTION

The objective of the present invention is to propose a passenger detector that does not have this disadvantage.

This objective is attained by a passenger detector comprising a flexible support of an insulating material, at least two electrode structures placed on said insulating substrate at a distance from each other, and a layer of semiconducting material placed on the top of said electrode structures in an active zone of the detector. In conformity with the invention, said layer of semiconducting material has an internal resistance that varies with a deformation of said layer, and said layer of semiconducting material is placed in intimate contact with said electrode structures.

It should be noted that the internal resistance of the semiconducting layer may vary not only with a compression of the layer but also with a bending or any other deformation of the layer. Moreover, the internal resistance of the layer may vary in the same sense as the deformation (e.g. the resistance increases when the pressure increases) or in the opposite sense of the deformation (e.g. the resistance decreases when the pressure increases).

DETAILED DESCRIPTION OF THE INVENTION

Figure 1:
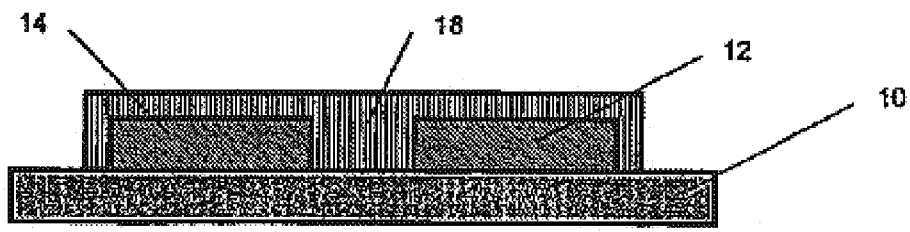
FIG. 1 is a sectional view of an active zone of a detector.
Figure 2:
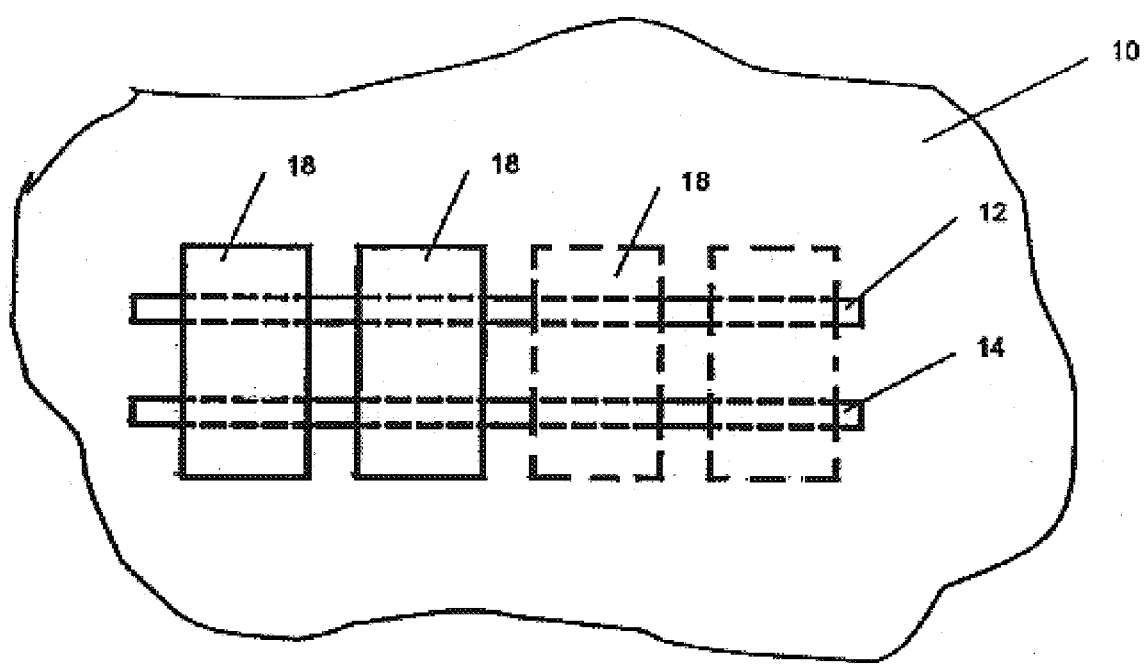
FIG. 2 is a top view of a section of a passenger detector.

FIGS. 1 and 2 show a flexible support 10, e.g., made of insulating fabric, with two electrode structures 12 and 14 arranged thereon, and with the electrodes spaced from each other. A layer of semiconducting material 18 is applied on top of the electrode structures in intimate contact with the electrode structures. FIG. 2 illustrates a top view of a section of a passenger—detector where the layer of semiconducting material is divided into several zones, which are arranged on the electrode structures for forming different active zones of the detector.

The detector according to the present invention therefore has only one supporting sheet, on to which are deposited both the electrode structures and the layer of semiconducting material. The rigidity conferred by the lamination of several layers no longer applies to the detector according to the present invention. Moreover, the passenger detector is not as thick as conventional detectors. Consequently, such a sensor causes much less discomfort when it is integrated into the seat of a vehicle and it therefore responds better to the demands of said seat as regards comfort.

Moreover, manufacturing the detector according to the present invention may cost less than producing conventional detectors. In effect, the use of only a single supporting sheet reduces the consumption of supporting sheet by half. In addition, there is no longer any need for a separator in the form of a two-sided adhesive band.

In conventional detectors, the supporting sheets and the separator enclosed a space between them, which had to be connected to the environment using ventilation channels in order to allow an exchange of pressure. However, these ventilation channels made the sensors sensitive to humidity, which reentered the detector together with the air from the environment. In the detector according to the invention, the ventilation channels are no longer necessary and the present detector forms a sensor that is closed and sealed, into which humidity can no longer enter.

Another advantage of the passenger detector described above is its lower susceptibility to production tolerances. In conventional detectors, the precision with which the two supporting sheets are positioned with respect to each other is a crucial factor in the assembly of the detector. A slight offset between the two sheets would lead to insufficient coverage of the semiconducting layer and hence to the production of a detector that does not comply with specifications. In the new detector, all the layers are deposited, printed or stuck on the same supporting sheet, which facilitates the positioning of the various layers with respect to each other ("matching") and therefore leads to sensors with very low production tolerances. The production of sensors not complying with specifications is consequently significantly reduced, which increases the productivity of the production line.

In order to increase still further the flexibility of the passenger detector, said flexible support preferably comprises a woven or non-woven fabric. This may be a cloth, a knitted cloth or one that is non-woven and made of insulating synthetic fibres. Such a support has a very great flexibility in three dimensions and hence adapts very well to the three-dimensional surface of the seat. Moreover, such a fabric may be very thin and, in spite of that, may have a very high resistance to mechanical stress. Any destruction of the support due to fatigue is therefore ruled out.

Another advantage of a fabric is its very high permeability to air and humidity. As a result, such a passenger detector does not form a barrier to humidity in the vehicle seat and hence completely satisfies all the requirements of said seat as regards comfort.

Said electrode structures are, for example, deposited or printed on the support of insulating material. Alternatively, said electrode structures are engraved or etched into a metallic layer deposited on said insulating support. The deposition or printing, or the engraving or etching, of the electrode structures is advantageously carried out simultaneously with the deposition, printing, engraving or etching of conductors for heating the seat.

In a first advantageous execution, said layer of semiconducting material comprises a semiconducting ink that is printed on said electrode structures. The printing is carried out, for example, by the screen-printing process or according to the inkjet method.

In an alternative execution, said layer of semiconducting material comprises a conducting elastomer, granulated or non-granulated, which is deposited or stuck on to said electrode structures. Such a layer of semiconducting material has a better flexibility than layers of semiconducting ink.

It should be noted that the layer of semiconducting material is preferably divided into several zones, positioned at different places above said electrode structures and thus defining several active zones of said detector.

In order to protect the detector from corrosion, the detector preferably comprises a protective layer applied on to said electrode structures and said layer or layers of semiconducting material. Said protective layer may be, for example, a layer of an inert lacquer that is applied by simple immersion of the sensor in the lacquer.

Because of its very great flexibility and its small thickness, the detector according to the present invention is very suitable for integration into a vehicle seat. Moreover, by virtue of these very advantageous characteristics, the present detector is compatible with many more seats than conventional detectors. In addition, the present detector is suitable for many more applications than a conventional detector.

In effect, a detector as described above may be integrated not only into the surface of the seat in order to detect the presence and/or the weight of any possible passenger, but also into the back of the seat and/or into the head-rest. When integrated into these places, the detector functions as a detector of position and may detect whether the passenger is resting against the back or the head-rest or whether the passenger is leaning forward. In the latter case, the functioning of the airbag system may, as a result, be modified. Similarly, such a detector may be easily integrated into the pads at the side of the seat in order to detect the lateral position of the passenger on said seat.

Apart from its applications in the seat, the passenger detector as described above may be integrated into the floor carpet in the body of the vehicle in order to detect whether or not the passenger's feet rest on the floor. Integrated into the seat belt, the detector may detect the passenger's position, since the seat-belt's inertia wheel system exerts a greater tension on the belt as it is increasingly unwound.

What is claimed is:

1. Passenger detector comprising
   a flexible support nude of an insulating fabric,
   at least two electrode structures applied on said insulating fabric at a distance from each other, each of said electrode structures comprising a lower surface and an opposing upper surface, said lower surface being in contact with said insulating fabric, and
   a layer of semiconducting material applied on top of said electrode structures in an active zone of said detector, said layer of semiconducting material being arranged in intimate contact with said upper surfaces of said electrode structures and having an internal resistance that varies with a compression of said layer induced by a passenger's presence when said detector is in use and which compression provides for a detecting of the passenger relative to the active zone, and wherein said opposing upper surfaces represent an upper extremity of said electrode structures and said applied layer of semiconducting material is applied to the upper extremity of said electrode structures, and wherein said layer of semiconducting material comprises a conducting elastomer, granulated onion-granulated, which is stuck on said electrode structures, and wherein the layer of semiconducting material is divided into several zones said zones being arranged at different places on said electrode structures, thus defining several active zones of said passenger detector.

2. Passenger detector according to claim 1, wherein said electrode structures are printed on said insulating fabric.

3. Passenger detector according to claim 2, wherein said layer of semiconducting material comprises a semiconducting ink which is printed on said electrode structures.

4. Detector according to claim 1, wherein said isulating fabric is a woven fabric.

5. Detector according to claim 1, wherein said insulating fabric is a non-woven fabric.

6. Detector according to claim 1, wherein said electrode structures are deposited on said insulating fabric.

7. Detector according to claim 1, comprising a metallic layer, which is deposited on said insulating fabric, wherein said electrode structures are engraved or etched in said metallic layer.

8. Detector according to claim 1, further comprising a protective layer applied onto said electrode structures and said layer of semiconducting material.

9. Vehicle seat comprising at least one passenger detector according to claim 1.

10. Vehicle seat according to claim 9, wherein said passenger detector is integrated into the surface of the seat.

11. Vehicle seat according to claim 9, wherein said passenger detector is integrated into the into the back of the seat.

12. Vehicle seat according to claim 9, wherein said passenger detector is integrated into the head-rest.

13. Passenger detector having a plurality of active zones, said detector comprising
    support of an insulating fabric,
    a flexible made
    at least two electrode structure applied on said insulating fabric at a distance from each other, each of said electrode structures comprising a lower surface and an opposing upper surface, said lower surface being in contact with a supporting surface of said insulating fabric,
    a layer of semiconducting material, said layer of semiconducting material having an internal resistance that varies with a compression of said layer induced by a passenger's presence when said passenger detector is in use, said layer of semiconducting material being divided into several zones, each of said zones being applied in one of said active zones of said detector and being stuck on said upper surfaces of said electrode structures so as to remain in a continuos state of intimate contact with said electrode structures when said layer is in a deformed and in a non-deformed state, said plurality of active zones being arranged in a pattern and providing for passenger detection relative to said zones upon compression induced by the passenger's presence, and wherein said insulating fabric is knitted, woven and fiber based non-woven fabric.

14. A passenger detector, comprising:
    a flexible support made of an insulating permeable material having a first surface and a second surface;
    first and second electrode structures, with each of said electrode structures having a bottom electrode surface in intimate contact with the first surface of said flexible support and an upper electrode surface, and said electrode structures being spaced at a distance from each other on the first surface of said flexible support;
    a plurality of active sensor zones provided on the first surface of said flexible support, said active sensor zones being defined by divided zones of a layer of semiconducting material with the semiconducting material having an internal resistance that varies with of the layer of semiconducting material induced by passenger's presence when said detector is in use, each divided zone being spaced apart on said first surface, and the semiconducting material of each of the divided zones being stuck to in continuous intimate contact with the upper surface of said first and second electrode structures and in continuous intimate contact with the first surface of said flexible support, and said zones being arranged for sensing presence of a passenger influencing said flexible support by inducing a compression force on said semiconducting material and varying the internal resistance of the semiconducting material, and wherein said semiconducting material is a conducting elastomer stuck on to said electrode structures and the first surface of said flexible support.

15. A passenger detector, comprising:
    a flexible support made of an insulating permeable material having a first surface and a second surface;
    first and second electrode structures, with each of said electrode structures having a bottom electrode surface in intimate contact with the first surface of said flexible support and an upper electrode surface, and said electrode structures being spaced at a distance from on the first surface of said flexible support;
    a plurality of active sensor zones provided on the first surface of said flexible support, said active sensor zones being defined by divided zones of a layer of semiconducting material with the semiconducting material having an internal resistance that varies with compression of the layer of semiconducting material against an underlying electrode, each divided zone being spaced apart on said first surface, and the semiconducting material of each of the divided zones being stuck to and in continuous intimate contact with the upper surface of said first and second electrode structures and in continuous intimate contact with the first surface of said flexible surface, and
    wherein said flexible support, on which both the electrode structures and semiconducting material are deposited, represents, in an integrated passenger detector arrangement, a sole contact and supporting sheet for the electrodes and semiconducting material, and wherein a compression of the semiconducting material, induced by a passenger, provides for passenger detection relative to active zones subject to the compression.

16. The passenger detector of claim 14 wherein said flexible support is a sheet of fabric.

17. The passenger detector of claim 14 wherein said flexible support is a sheet of woven fabric.

18. The passenger detector of claim 14 wherein said flexible support is a sheet of non-woven material comprising insulating fibers.

19. The passenger detector of claim 14 wherein said semiconducting material comprises a semiconducting ink which is in intimate contact with the electrode structures and the first surface of said flexible support by way of a printing application.

20. The passenger detector of claim 14 wherein said semiconducting material is a conducting elastomer print deposited on to said electrode structures and the first surface of said flexible support.

21. The passenger detector of claim 14 wherein said semiconducting material is in intimate contact with said electrode structures so as to form a plurality of closed and sealed active sensor zones.

22. The passenger detector of claim 14 wherein said electrode structures are printed on said flexible support.

23. The passenger detector of claim 14 wherein said electrode structures are portions of a deposited metallic layer subjected to an engraving or etching process.

24. The passenger detector of claim 14 wherein the semiconductor material is of a type which results in a decrease in resistance in an active zone of the detector upon compression of a portion of the semiconducting material covering an electrode structure in a dividing zone against a supporting surface of the electrode structure.

* * * * *

UNITED STATES PATENT AND TRADEMARK OFFICE
CERTIFICATE OF CORRECTION

PATENT NO. : 6,737,953 B2  Page 1 of 1
APPLICATION NO. : 09/848402
DATED : May 18, 2004
INVENTOR(S) : Bogdan Serban et al.

It is certified that error appears in the above-identified patent and that said Letters Patent is hereby corrected as shown below:

Col. 4 Claim 1, line 2, replace "nude" with --made--;

Col. 4 Claim 1, line 22, replace "onion-granulated" with --non-granulated--;

Col. 5 Claim 11, line 2, delete the first occurrence of "into the";

Col. 5 Claim 13, lines 3-4, delete in their entirety and replace with --a flexible support made of an insulating fabric--;

Col. 5 Claim 13, line 5, replace "structure" with --structures--;

Col. 5 Claim 13, line 19, replace "continuos" with --continuous--;

Col. 5 Claim 13, line 25, insert --one of a-- after "is";

Col. 5-6 Claim 14, line 14, insert --compression-- after "with";

Col. 5-6 Claim 14, line 15, insert --a-- after "by";

Col. 5-6 Claim 14, line 19, insert --and-- between "to" and "in";

Col. 6 Claim 15, line 8, insert --each other-- between "from" and "on"; and

Col. 6 Claim 15, line 22, replace "surface" with --support--.

Signed and Sealed this

Nineteenth Day of August, 2008

JON W. DUDAS
*Director of the United States Patent and Trademark Office*